(12) United States Patent
Yano et al.

(10) Patent No.: US 8,372,492 B2
(45) Date of Patent: Feb. 12, 2013

(54) PRESSURE-SENSITIVE ADHESIVE OPTICAL FILM AND IMAGE DISPLAY

(75) Inventors: Kohei Yano, Ibaraki (JP); Akiko Ogasawara, Ibaraki (JP); Tsuyoshi Chiba, Ibaraki (JP); Yuusuke Toyama, Ibaraki (JP); Shinichi Inoue, Ibaraki (JP); Masayuki Satake, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 1033 days.

(21) Appl. No.: 11/955,850

(22) Filed: Dec. 13, 2007

(65) Prior Publication Data

US 2008/0145572 A1 Jun. 19, 2008

(30) Foreign Application Priority Data

Dec. 15, 2006 (JP) .................. 2006-338754
Oct. 24, 2007 (JP) .................. 2007-276416

(51) Int. Cl.
  *B32B 7/12* (2006.01)
  *B32B 15/082* (2006.01)
(52) U.S. Cl. .......... 428/1.54; 428/355 RA; 428/355 AC; 349/122
(58) Field of Classification Search ............ 428/1.5, 428/1.52–1.54, 355 AC, 355 AN, 355 N, 428/355 R, 355 RA; 349/122
See application file for complete search history.

(56) References Cited

U.S. PATENT DOCUMENTS

| | | | |
|---|---|---|---|
| 5,795,650 A | 8/1998 | Watanabe et al. | |
| 7,846,542 B2 * | 12/2010 | Toyama et al. | 428/355 AC |
| 7,862,888 B2 * | 1/2011 | Toyama et al. | 428/354 |
| 2003/0032715 A1 * | 2/2003 | Sakaitani et al. | 524/558 |
| 2003/0198807 A1 * | 10/2003 | Banba et al. | 428/343 |
| 2004/0092685 A1 * | 5/2004 | Husemann et al. | 526/217 |
| 2005/0073633 A1 | 4/2005 | Satake et al. | |
| 2005/0084670 A1 | 4/2005 | Satake et al. | |
| 2005/0215743 A1 | 9/2005 | Kawamura et al. | |
| 2005/0239965 A1 | 10/2005 | Kim et al. | |
| 2006/0098452 A1 | 5/2006 | Choi et al. | |

(Continued)

FOREIGN PATENT DOCUMENTS

| | | | |
|---|---|---|---|
| JP | 8-95032 | A | 4/1996 |
| JP | 9-87593 | A | 3/1997 |

(Continued)

OTHER PUBLICATIONS

Japanese Office Action dated Feb. 4, 2011, issued in corresponding Japanese Patent Application No. 2007-276416. English Translation.

(Continued)

*Primary Examiner* — Sophie Hon
(74) *Attorney, Agent, or Firm* — Westerman, Hattori, Daniels & Adrian, LLP (57) ABSTRACT

A pressure-sensitive adhesive optical film of the present invention comprises: an optical film comprising a transparent base film and a discotic liquid crystal layer on one side of the transparent base film; and a pressure-sensitive adhesive layer that is provided on the discotic liquid crystal layer, wherein the pressure-sensitive adhesive layer is made from a pressure-sensitive adhesive containing an acrylic polymer comprising an alkyl(meth)acrylate (a1) and a ring structure-containing (meth)acrylate (a2) as monomer units and having a weight average molecular weight of 1,000,000 to 3,000,000, and a crosslinking agent. The pressure-sensitive adhesive optical film has durability and can be prevented from causing display unevenness in a peripheral portion of a display screen.

11 Claims, 1 Drawing Sheet

U.S. PATENT DOCUMENTS

| | | | |
|---|---|---|---|
| 2006/0121273 A1* | 6/2006 | Toyama et al. | 428/343 |
| 2007/0114491 A1 | 5/2007 | Shi et al. | |
| 2008/0033109 A1* | 2/2008 | Tomita et al. | 525/100 |
| 2009/0022988 A1 | 1/2009 | Toyama et al. | |

FOREIGN PATENT DOCUMENTS

| | | |
|---|---|---|
| JP | 2767382 B2 | 6/1998 |
| JP | 10-279907 A | 10/1998 |
| JP | 2004-78143 A | 3/2004 |
| JP | 2005-053976 A | 3/2005 |
| JP | 2005-070094 A | 3/2005 |
| JP | 2005-263894 A | 9/2005 |
| JP | 2006-232910 A | 9/2006 |
| JP | 2006-259664 A | 9/2006 |
| KR | 20020060272 A | 7/2002 |
| KR | 10-2005-0102997 A | 10/2005 |
| KR | 10-2006-0041444 A | 5/2006 |
| KR | 10-2006-0061910 A | 6/2006 |
| KR | 10-2006-0072086 A | 6/2006 |
| KR | 10-2006-0097561 A | 9/2006 |
| WO | 2006/009250 A1 | 1/2006 |

OTHER PUBLICATIONS

Taiwanese Office Action dated Aug. 5, 2011, issued in corresponding Taiwanese Patent Application No. 096148151.

Japanese Office Action dated Apr. 21, 2011, issued in corresponding Japanese Patent Application No. 2007-276416.

Taiwanese Office Action dated May 22, 2012, issued in corresponding Taiwanese Patent Application No. 096148151, (10 pages). W/ English Translation.

* cited by examiner

PRESSURE-SENSITIVE ADHESIVE OPTICAL FILM AND IMAGE DISPLAY

BACKGROUND OF THE INVENTION

1. Field of the Invention

The present invention relates to a pressure-sensitive adhesive optical film. The present invention also relates to an image display, such as a liquid crystal display, an organic electroluminescent display, a cathode ray tube (CRT), and a plasma display panel (PDP), using the pressure-sensitive adhesive optical film.

The pressure-sensitive adhesive optical film of the present invention has an discotic liquid crystal layer and is useful as an optical compensation film to improve display contrast and the viewing angle characteristics of displayed colors. In particular, the pressure-sensitive adhesive optical film having a polarizer laminated therein is useful as an elliptically polarizing plate with the function of optical compensation.

2. Description of the Related Art

The liquid crystal display market has rapidly expanded in such fields as clocks, mobile phones, PDAs, note PCs, PC monitors, DVD players, and TVs. Liquid crystal displays use liquid crystal switching to visualize changes in polarization state, and based on the display principle, they use polarizers. Particularly in TV applications and the like, there is an increasing demand for high brightness and high contrast display, and thus brighter (higher transmittance) and higher contrast (higher degree of polarization) polarizers have been developed and introduced.

The currently dominating type of general liquid crystal displays is a TFT-LCD using a TN liquid crystal. This type has the advantages of a high response speed and a capability of producing high contrast. However, if displays on TN liquid crystal panels are viewed at angles oblique to the normal direction, their contrast can be significant low, or gradation reversal, an event in which the gradation of displays is inverted, or the like can take place. Thus, TN liquid crystals have very narrow viewing angle characteristics. On the other hand, applications such as large PC monitors and large screen televisions should satisfy certain requirements such as high contrast, wide viewing angle, and little fluctuation in display colors over viewing angles. Thus, TN mode TFT-LCDs for use in such applications must have a retardation film for compensating for viewing angles.

Conventionally, stretched birefringent polymer films have been used as the retardation film. Recently, it has been proposed that the optical compensation film made of such a stretched birefringent film is replaced with another optical compensation film having an optically anisotropic layer formed of a liquid crystalline molecule on a transparent support. Since liquid crystalline molecules can have various orientation modes, the use of liquid crystalline molecules has enabled the achievement of certain optical properties that had not been achieved with conventional stretched birefringent polymer films.

For example, one of the proposed retardation films for viewing angle compensation is Wide View Film manufactured by Fuji Photo Film Co., Ltd., which uses a discotic liquid crystal with negative refractive index anisotropy (see JP-A No. 08-95032 and JP-B No. 2767382). This retardation film includes a transparent base film and a discotic liquid crystal layer that is provided on one side of the base film and has an obliquely-oriented optical axis. The main purpose of this retardation film is to improve viewing angle characteristics in a state where a certain voltage for black viewing is applied. Specifically, in a state where a certain voltage is applied, a liquid crystal molecule in a liquid crystal cell shows positive refractive index anisotropy with an optical axis tilted with respect to a glass substrate. In order to compensate for the retardation caused by this refractive index anisotropy, the retardation film uses a liquid crystalline molecule having an optical axis tilted with respect to the film normal direction and having negative refractive index anisotropy.

In the retardation film for viewing angle compensation, a polarizer is laminated on the transparent base film to form an elliptically polarizing plate, and a pressure-sensitive adhesive is laminated on the discotic liquid crystal layer. The pressure-sensitive adhesive optical film having the pressure-sensitive adhesive layer laminated therein and serving as a retardation film, an elliptically polarizing plate, or the like is bonded to a liquid crystal cell or the like through the pressure-sensitive adhesive layer. The above-mentioned retardation film for viewing angle compensation or the above-mentioned elliptically polarizing plate may be bonded to a liquid crystal cell or the like through the pressure-sensitive adhesive layer to form a liquid crystal display.

Acrylic pressure-sensitive adhesives including an acrylic polymer as a base polymer are frequently used for pressure-sensitive adhesive-attached optical films, because of their good adhesion, transparency and so on. Methods for crosslinking acrylic pressure-sensitive adhesives use isocyanate crosslinking agents and a combination with the copolymerized functional monomers to the acrylic polymer in many cases.

Such optical films are bonded to liquid crystal cells to form liquid crystal panels, which are used and incorporated into liquid crystal displays. Liquid crystal displays have been used at first for calculators and later for televisions, monitors and so on. Liquid crystal displays are placed under various conditions such as hot and/or humid conditions and thus required to have high durability such that display quality degradation can be prevented.

When liquid crystal displays are placed under hot and/or humid conditions, however, display unevenness can sometimes occur in the peripheral portion of the liquid crystal panel to cause display defects. The display unevenness in the peripheral portion can be significantly found, particularly when the above-mentioned retardation film for viewing angle compensation or the above-mentioned elliptically polarizing plate is used.

In order to improve the display unevenness in the peripheral portion, it is proposed that a pressure-sensitive adhesive composition containing a plasticizer or an oligomer component should be used for the pressure-sensitive adhesive-attached optical film (see JP-A No. 09-87593 or JP-A No. 10-279907). However, such a pressure-sensitive adhesive composition has a problem in which the dopant such as the plasticizer or the oligomer component can be precipitated to cause defects in appearance or degradation of the pressure-sensitive adhesive in a long-time heating test.

SUMMARY OF THE INVENTION

It is an object of the present invention to provide a pressure-sensitive adhesive optical film that includes a transparent base film, a discotic liquid crystal layer including an aligned discotic liquid crystal compound on one side of the transparent base film and a pressure-sensitive adhesive layer laminated on the discotic liquid crystal layer, and that has durability and can be prevented from causing display unevenness in a peripheral portion of a display screen.

It is another object of the present invention to provide an image display using such a pressure-sensitive adhesive optical film.

As a result of investigation for solving the problems, the inventors have found that the objects can be achieved with the pressure-sensitive adhesive optical film described below, and has finally completed the present invention.

The present invention relates to a pressure-sensitive adhesive optical film, comprising:

an optical film comprising a transparent base film and a discotic liquid crystal layer on one side of the transparent base film; and a pressure-sensitive adhesive layer that is provided on the discotic liquid crystal layer, wherein the pressure-sensitive adhesive layer is made from a pressure-sensitive adhesive containing an acrylic polymer comprising an alkyl(meth)acrylate (a1) and a ring structure-containing (meth)acrylate (a2) as monomer units and having a weight average molecular weight of 1,000,000 to 3,000,000, and a crosslinking agent.

In the pressure-sensitive adhesive optical film, the acrylic polymer preferably comprises 30 to 90% by weight of the alkyl(meth)acrylate (a1) and 10 to 70% by weight of the ring structure-containing (meth)acrylate (a2) as monomer units.

In the pressure-sensitive adhesive optical film, the ring structure-containing (meth)acrylate (a2) is preferably an aromatic ring structure-containing (meth)acrylate.

In the pressure-sensitive adhesive optical film, the acrylic polymer further may comprise 10% or less by weight of a monomer unit (a3) besides the components (a1) and (a2).

In the pressure-sensitive adhesive optical film, the acrylic polymer preferably has a weight average molecular weight of 1,000,000 to 3,000,000, and the percentage of components with a molecular weight of 100,000 or less in the acrylic polymer is 15% or less by area.

In the pressure-sensitive adhesive optical film, the pressure-sensitive adhesive preferably contains a silane coupling agent.

In the pressure-sensitive adhesive optical film, the pressure-sensitive adhesive layer is preferably provided on the discotic liquid crystal layer via an undercoat layer. The undercoat layer is preferably made of a polyethyleneimine-based material.

In the pressure-sensitive adhesive optical film, the optical film further may comprises a polarizer that is laminated on another side of the transparent base film where the discotic liquid crystal layer is not provided.

The present invention also relates to an image display, comprising the above pressure-sensitive adhesive optical film.

The pressure-sensitive adhesive optical film of the present invention includes a discotic liquid crystal layer functioning as an optical compensation layer. An acrylic polymer including an alkyl(meth)acrylate (a1) and a ring structure-containing (meth)acrylate (a2) as monomer components and having a weight average molecular weight of 1,000,000 to 3,000,000 is used as a base polymer of a pressure-sensitive adhesive for forming a pressure-sensitive adhesive layer provided on the discotic liquid crystal layer, so that display unevenness can be prevented in peripheral portions of a display screen. In the pressure-sensitive adhesive optical film of the present invention, the component (a2) is used as a monomer unit of the base polymer in the pressure-sensitive adhesive for forming the pressure-sensitive adhesive layer, so that display unevenness can be suppressed in peripheral portions, and, therefore, precipitation of a dopant itself, as in pressure-sensitive adhesives using a dopant such as a plasticizer in addition to a base polymer, does not occur, so that defects in appearance or pressure-sensitive adhesive degradation can be prevented.

DETAILED DESCRIPTION OF THE PREFERRED EMBODIMENTS

Figure 1:
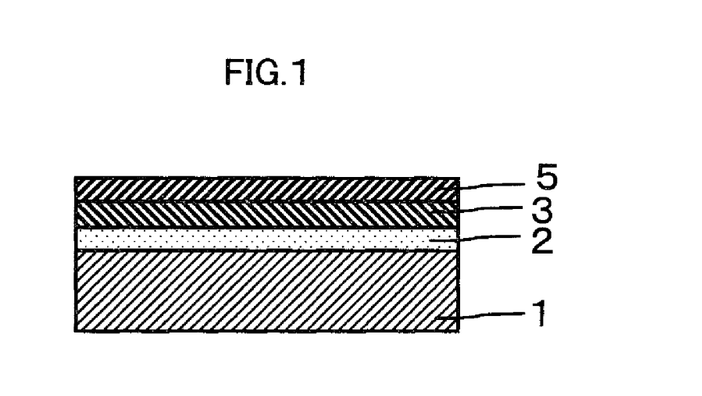
FIG. 1 is a cross-sectional view of an example of the pressure-sensitive adhesive optical film of the present invention.

The present invention is described below with reference to the drawings. As shown in FIG. 1, the pressure-sensitive adhesive optical film of the present invention includes a transparent base film 1, a discotic liquid crystal layer 3 provided on one side of the base film 1, and a pressure-sensitive adhesive layer 5 provided on the discotic liquid crystal layer 3. While FIG. 1 illustrates a case where an alignment film 2 is placed between the transparent base film 1 and the discotic liquid crystal layer 3, one side of the transparent base film 1 may be subjected to rubbing treatment, instead of providing the alignment film 2.

Figure 2:
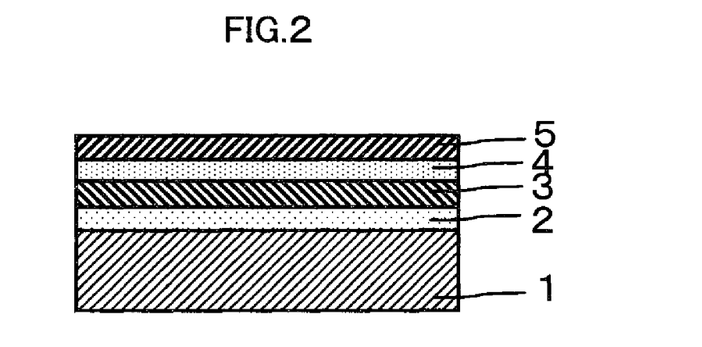
FIG. 2 is a cross-sectional view of another example of the pressure-sensitive adhesive optical film of the present invention.

FIG. 2 exemplifies where the pressure-sensitive adhesive optical film includes a pressure-sensitive adhesive layer 5 provided on the discotic liquid crystal layer 3 with an undercoat layer 4 interposed therebetween.

Figure 3:
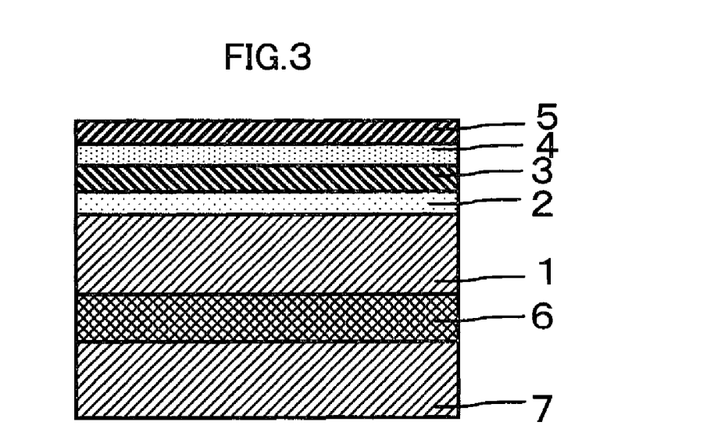
FIG. 3 is a cross-sectional view of a further example of the pressure-sensitive adhesive optical film of the present invention.

FIG. 3 shows a case where the pressure-sensitive adhesive optical film of FIG. 2 further includes a polarizer 6 and a transparent protective film 7 that are laminated in this order on one side of the transparent base film 1 where the discotic liquid crystal layer 3 is not formed. In FIG. 3, the transparent base film 1 also serves as a transparent protective film for the polarizer 6. The case in FIG. 3 is applied to the pressure-sensitive adhesive optical film in FIG. 2 in the same way.

Various types of transparent materials may be used for the transparent base film. For example, polyester type polymers, such as polyethylene terephthalate and polyethylenenaphthalate; cellulose type polymers, such as diacetyl cellulose and triacetyl cellulose; acrylics type polymer, such as poly methylmethacrylate; styrene type polymers, such as polystyrene and acrylonitrile-styrene copolymer (AS resin); polycarbonate type polymer may be mentioned. Besides, as examples of the polymer forming the base film, polyolefin type polymers, such as polyethylene, polypropylene, polyolefin that has cyclo-type or norbornene structure, ethylene-propylene copolymer; vinyl chloride type polymer; amide type polymers, such as nylon and aromatic polyamide; imide type polymers; sulfone type polymers; polyether sulfone type polymers; polyether-ether ketone type polymers; poly phenylene sulfide type polymers; vinyl alcohol type polymer; vinylidene chloride type polymers; vinyl butyral type polymers; arylate type polymers; polyoxymethylene type polymers; epoxy type polymers; or blend polymers of the above-mentioned polymers may be mentioned.

Moreover, as is described in Japanese Patent Laid-Open Publication No. 2001-343529 (WO 01/37007), polymer films, for example, resin compositions including (A) thermoplastic resins having substituted and/or non-substituted imido group is in side chain, and (B) thermoplastic resins having substituted and/or non-substituted phenyl and nitrile group in sidechain may be mentioned. As an illustrative example, a film may be mentioned that is made of a resin composition including alternating copolymer comprising iso-butylene and N-methyl maleimide, and acrylonitrile-styrene copolymer. A film comprising mixture extruded article of resin compositions etc. may be used.

In general, a thickness of the transparent base film, which can be determined arbitrarily, is 1 to 500 µm, especially 5 to 200 µm in viewpoint of strength, work handling and thin layer.

The transparent base film is preferably as colorless as possible. Thus, the transparent base is preferably used which has a film-thickness-direction retardation of −90 nm to +75 nm, wherein the retardation (Rth) is represented by the formula: $Rth=[(nx+ny)/(2-nz)]d$, wherein nx and ny are each a principal refractive index in the plane of the film, nz is a refractive index in the film-thickness direction, and d is the thickness of the film. If the transparent base with such a thickness-direction retardation value (Rth) of −90 nm to +75 nm is used, coloring (optical coloring) of the polarizing plate can be almost avoided, which could otherwise be caused by any other transparent base film. The thickness-direction retardation (Rth) is more preferably from −80 nm to +60 nm, particularly preferably from −70 nm to +45 nm.

As the transparent base film, if polarization property and durability are taken into consideration, cellulose based polymer, such as triacetyl cellulose and norbornene based polymer, are preferable, and especially cellulose based polymer, such as triacetyl cellulose is suitable.

The discotic liquid crystal layer is usually formed by aligning a discotic liquid crystal compound having a polymerizable unsaturated group and curing it. The discotic liquid crystal layer is useful as an optical compensation layer and can increase viewing angle, contrast, brightness, and the like. In a preferred mode, the discotic liquid crystal compound is obliquely aligned in the discotic liquid crystal layer. The thickness of the discotic liquid crystal layer is generally from about 0.5 to about 10 µm.

Discotic liquid crystal compounds have negative refractive index anisotropy (uniaxiality). Examples thereof include benzene derivatives as described in the research report by C. Destrade et al., Mol. Cryst. vol. 71, p. 111 (1981); cyclohexane derivatives as described in the research report by B. Kohne et al., Angew. Chem., vol. 96, p. 70 (1984); and azacrown or phenylacetylene type macrocyclic compounds as described in the research report by J. M. Lehn et al., J. Chem. Commun., p. 1794 (1985) and the research report by J. Zhang et al., J. Am. Chem. Soc., vol. 116, p. 2655 (1994). Discotic liquid crystal compounds may generally have a structure in which any of them forms a core at the center of the molecule and has radially provided straight substituents such as straight alkyl or alkoxy groups and substituted benzoyloxy groups. Discotic liquid crystal compounds include compounds that exhibit liquid crystal properties and are generally called "discotic liquid crystal." It will be understood that discotic liquid crystal compounds are not limited to the above and include any molecule that has negative uniaxiality and can be oriented in a certain degree. In the present invention, the discotic liquid crystal compound, which have a polymerizable unsaturated group, such as an acryloyl, methacryloyl, vinyl, or allyl group, and capable of causing a curing reaction by means of heat, light or the like, is usually used. In the discotic liquid crystal layer, the final product is not necessarily the above-described compound and may include substances that have been polymerized or crosslinked by the reaction of the polymerizable unsaturated group and lost the liquid crystal properties by polymerization.

Discotic liquid crystal compounds encompasses not only various types of discotic liquid crystal compounds but also the whole of compounds whose molecule has optically-negative uniaxiality by itself, such as reaction products of discotic liquid crystals, which have already lost liquid crystal properties due to reaction with any other low-molecular-weight compound or polymer.

Alignment treatment of the discotic liquid crystal may be performed by rubbing the surface of the transparent base film or using an alignment film. Examples of the alignment film include obliquely vapor-deposited inorganic films and specific rubbed organic polymer films. Examples thereof also include thin films in which molecules are isomerized by light and uniformly arranged in a certain direction, such as LB films comprising azobenzene derivatives. Examples of organic alignment films include polyimide films and organic polymer films having a hydrophobic surface, such as alkyl chain-modified polyvinyl alcohol, polyvinyl butyral, or poly methylmethacrylate. Obliquely vapor-deposited inorganic films include obliquely vapor-deposited SiO films.

For example, a method that obliquely align the discotic liquid crystal compound includes forming an alignment film on the transparent base film, then applying the discotic liquid crystal compound, which is polymerizable liquid crystal compound, thereto so that the compound is obliquely aligned, and then fixing the compound by application of light such as ultraviolet light or heat. Alternatively, the discotic liquid crystal may be obliquely aligned on any other alignment substrate and then transferred to the transparent support by the use of an optically-transparent adhesive or pressure-sensitive adhesive to form the discotic liquid crystal compound.

The discotic liquid crystal layers disclosed in Patent Literature (JP-A No. 08-95032 and JP-B No. 2767382) are preferably used. Wide View films manufactured by Fuji Photo Film Co., Ltd. have such an obliquely-aligned discotic liquid crystal layer formed on a cellulose polymer film.

In a desirable mode, the material for forming the undercoat layer shows good adhesion to both the pressure-sensitive adhesive layer and the discotic liquid crystal layer and can form a coating film with high cohesive strength. Materials that have such properties may be used include various types of polymers, metal oxide sols, silica sols and so on. In particular, polymers are preferably used.

Examples of the polymer include polyurethane resins, polyester resins, and polymers having an amino group in their molecule. The polymer to be used may be in any of a solvent-soluble form, a water-dispersible form and a water-soluble form. For example, water-soluble polyurethanes, water-soluble polyesters, water-soluble polyamides, and the like, and water-dispersible resins, such as ethylene-vinyl acetate copolymer emulsions and (meth)acrylic polymer emulsions, may be used. Water-dispersible types that may be used include emulsions produced by emulsifying various resins such as polyurethanes, polyesters and polyamides with an emulsifying agent; and self-emulsified products produced by introducing a water-dispersible hydrophilic anionic, cationic or nonionic group into any of the above resins. Ionic polymer complexes may also be used.

When the pressure-sensitive adhesive layer contains an isocyanate compound, the polymer preferably has a functional group reactive with the isocyanate compound. Such a polymer preferably has an amino group in its molecule. In particular, a polymer having a primary amino group at its end is preferably used. Such a polymer reacts with the isocyanate compound to produce strong adhesion.

Examples of the polymer having an amino group in its molecule include polyethyleneimines, polyallylamines, polyvinylamines, polyvinylpyridines, polyvinylpyrrolidines, and polymers of amino group-containing monomers such as dimethylaminoethyl acrylate. In particular, polyethyleneimines are preferred. Any type of polyethyleneimine material having a polyethyleneimine structure may be used, and examples thereof include polyethyleneimine and ethyleneimine adducts and/or polyethyleneimine adducts of polyacrylate.

Various types of polyethyleneimine may be used without limitation. The weight average molecular weight of the polyethyleneimine is generally, but not limited to, from about 100 to about 1,000,000. Commercially available examples of the polyethyleneimine include Epomin SP series (such as SP-003, SP006, SP012, SP018, SP103, SP110, and SP200) and Epomin P-1000 manufactured by Nippon Shokubai Co., Ltd. Epomin P-1000 is particularly preferred.

Ethyleneimine adducts and/or polyethyleneimine adducts of polyacrylate may be obtained by emulsion polymerization of alkyl(meth)acrylate for forming a base polymer (acrylic polymer) of the acrylic pressure-sensitive adhesive described later and another monomer copolymerizable therewith in a conventional manner. The copolymerizable monomer to be used has a functional group such as a carboxyl group such that it can react with ethyleneimine or the like. The content of the monomer having such a functional group as carboxyl may be appropriately adjusted depending on the content of ethyleneimine or the like for the reaction. A styrene type monomer is preferably used as the copolymerizable monomer. The carboxyl group or the like in an acrylate may be allowed to react with a separately synthesized polyethyleneimine so that adducts grafted with polyethyleneimine can be produced. Commercially available examples thereof include Polyment NK-380 manufactured by Nippon Shokubai Co., Ltd.

Ethyleneimine adducts and/or polyethyleneimine adducts of acrylic polymer emulsions may also be used. Commercially available examples thereof include Polyment SK-1000 manufactured by Nippon Shokubai Co., Ltd.

In the process of forming the undercoat layer, for example, a compound capable of reacting with an amino group-containing polymer may be mixed with it to crosslink it so that the strength of the undercoat layer can be increased. Examples of the compound capable of reacting with an amino group-containing polymer include epoxy compounds and the like.

When the undercoat layer is provided, the pressure-sensitive adhesive layer may be formed after the undercoat layer is formed on the optical film. For example, an undercoating solution such as an aqueous polyethyleneimine solution may be applied by such a method as coating, dipping, or spraying, and dried to form the undercoat layer. The thickness of the undercoat layer is preferably in the range of about 10 to about 5000 nm, more preferably of 50 to 500 nm. If the undercoat layer is too thin, it cannot have properties as a bulk or cannot exhibit sufficient strength so that adequate adhesion cannot be achieved in some cases. If it is too thick, the optical properties can be degraded.

The pressure-sensitive adhesive for forming the pressure-sensitive adhesive layer according to the present invention contains, as a base polymer, an acrylic polymer including an alkyl(meth)acrylate (a1) and a ring structure-containing (meth)acrylate (a2) as monomer units. As used herein, "(meth)acrylate" refers to acrylate and/or methacrylate, and means the same as "(meth)" with respect to the present invention.

In the alkyl(meth)acrylate (a1), the alkyl group may have about 1 to about 18 carbon atom(s), preferably 1 to 9 carbon atom(s) and may be any of a straight chain and a branched chain. Examples of the alkyl(meth)acrylate includes methyl (meth)acrylate, ethyl(meth)acrylate, propyl(meth)acrylate, isopropyl(meth)acrylate, n-butyl(meth)acrylate, isobutyl (meth)acrylate, pentyl (meth)acrylate, hexyl (meth)acrylate, 2-ethylhexyl (meth)acrylate, n-octyl(meth)acrylate, isooctyl (meth)acrylate, decyl(meth)acrylate, dodecyl(meth)acrylate, lauryl(meth)acrylate, stearyl(meth)acrylate and so on. These may be used singly or in any combination. The average number of carbon atoms in these alkyl groups is preferably from 4 to 12.

The ring structure of the ring structure-containing (meth)acrylate (a2) may be an aromatic ring structure or an alicyclic structure. Examples of the aromatic ring structure include a benzene ring, a naphthalene ring, a thiophene ring, a pyridine ring, a pyrrole ring, a furan ring and so on. Examples of the aromatic ring structure-containing (meth)acrylate include phenoxyethyl(meth)acrylate, benzyl(meth)acrylate, phenoxy-2-hydroxypropyl(meth)acrylate, phenol ethylene oxide-modified (meth)acrylate, 2-naphthoxyethyl(meth)acrylate, 2-(4-methoxy-1-naphthoxy)ethyl(meth)acrylate, phenoxypropyl(meth)acrylate, phenoxyethylene glycol (meth)acrylate, thiophenyl(meth)acrylate, pyridyl(meth)acrylate, pyrrolyl(meth)acrylate, phenyl(meth)acrylate, polystyryl(meth)acrylate and so on. Examples of the alicyclic structure include a cyclo ring, a terpene ring, a bicyclo ring, a tetrahydrofuran ring, a piperidine ring, a pyrrolidine ring, a morpholine ring and so on. Examples of the alicyclic structure-containing (meth)acrylate include cyclohexyl(meth)acrylate, isobornyl(meth)acrylate, cyclopentyl(meth)acrylate, dicyclopentenyl(meth)acrylate, dicyclopentenyloxyethyl(meth)acrylate, tricyclo[$5.2.1.0^{2,6}$]decanyl(meth)acrylate, tetrahydrofurfuryl(meth)acrylate, acryloyl morpholine and so on. The ring structure-containing (meth)acrylate (a2) preferably has an aromatic ring structure in terms of reducing display unevenness in peripheral portions. One of the reasons for this may be that the polarizability of the aromatic ring is high, although the reason is not clear. A phenyl group-containing (meth)acrylate such as phenoxyethyl(meth)acrylate and phenoxy-2-hydroxypropyl(meth)acrylate is preferred, because the linkage between the benzene ring and the ether linkage can produce higher polarizability.

In the acrylic polymer, the percentage of the alkyl(meth)acrylate (a1) as a monomer unit is preferably from 30 to 90% by weight, and the percentage of the ring structure-containing (meth)acrylate (a2) as another monomer unit is preferably from 10 to 70% by weight. The percentage of the ring structure-containing (meth)acrylate (a2) is more preferably from 15 to 60% by weight, still more preferably from 20 to 50% by weight. In addition, the alkyl(meth)acrylate (a1) is the balance for the component (a2). The percentage of the (a2) component is preferably set at 10% or more by weight in that the peripheral unevenness may be reduced. If the percentage of the (a2) component is 70% or less by weight, the peripheral unevenness can be reduced, while durability can be increased.

The acrylic polymer may also contain (a3) another monomer component as a monomer unit besides said (a1) and (a2) components.

Examples of the (a3) component include hydroxyl group-containing monomers such as 2-hydroxyethyl(meth)acrylate, 2-hydroxypropyl(meth)acrylate, 4-hydroxybutyl(meth)acrylate, 6-hydroxyhexyl(meth)acrylate, 8-hydroxyoctyl(meth)acrylate, 10-hydroxydecyl(meth)acrylate, 12-hydroxylauryl (meth)acrylate, and (4-hydroxymethylcyclohexyl)-methyl acrylate; carboxyl group-containing monomers such as include (meth)acrylic acid, carboxyethyl(meth)acrylate, carboxypentyl(meth)acrylate, itaconic acid, maleic acid, fumaric acid, and crotonic acid; acid anhydride group-containing monomers such as maleic anhydride and itaconic anhydride; caprolactone addition products of acrylic acid; sulfonic acid group-containing monomers such as styrenesulfonic acid, allylsulfonic acid, 2-(meth)acrylamido-2-methylpropanesulfonic acid, (meth)acrylamidopropanesulfonic acid, sulfopropyl(meth)acrylate, and (meth)acryloyloxynaphthalenesulfonic acid; and phosphate group-containing monomers such as 2-hydroxyethylacryloyl phosphate.

The (a3) component may be derived from a nitrogen-containing vinyl monomer. Examples of such a monomer for modification include maleimide; (N-substituted) amide monomers such as (meth)acrylamide, N,N-dimethyl(meth)acrylamide, N,N-diethyl(meth)acrylamide, N-hexyl(meth)acrylamide, N-methyl(meth)acrylamide, N-butyl(meth)acrylamide, N-butyl(meth)acrylamide, N-methylol(meth)acrylamide, N-methylolpropane(meth)acrylamide; alkylaminoalkyl(meth)acrylate monomers such as aminoethyl(meth)acrylate, aminopropyl(meth)acrylate, N,N-dimethylaminoethyl(meth)acrylate, and tert-butylaminoethyl(meth)acrylate; alkoxyalkyl(meth)acrylate monomers such as methoxyethyl(meth)acrylate and ethoxyethyl(meth)acrylate; and succinimide monomers such as N-(meth)acryloyloxymethylenesuccinimide, N-(meth)acryloyl-6-oxyhexamethylenesuccinimide, and N-(meth)acryloyl-8-oxyoctamethylenesuccinimide.

The (a3) component may also be derived from vinyl monomers such as vinyl acetate, vinyl propionate, N-vinylcarboxylic acid amides, styrene, α-methylstyrene, and N-vinylcaprolactam; nitrile monomers such as acrylonitrile and methacrylonitrile; epoxy group-containing acrylic monomers such as glycidyl(meth)acrylate; glycol acrylate monomers such as polyethylene glycol(meth)acrylate, polypropylene glycol(meth)acrylate, methoxyethylene glycol(meth)acrylate, and methoxypolypropylene glycol(meth)acrylate; and (meth)acrylate monomers such as fluoro(meth)acrylate, silicone(meth)acrylate, and 2-methoxyethyl acrylate.

The (a3) component may be used as appropriate in order to modify the base polymer. One or more types of the (a3) components may be used. In the acrylic polymer, the percentage of the (a3) component as a monomer unit is preferably 10% or less by weight, more preferably 6% or less by weight. It is not preferred that the percentage of the (a3) component is more than 10% by weight, because the pressure-sensitive adhesive can possibly lose flexibility.

The (a3) component is preferably derived from a carboxyl group-containing monomer, particularly acrylic acid, in that the adhesion property thereof is good. The percentage of the (a3) component derived from the carboxyl group-containing monomer may be from about 0.1 to about 10% by weight, preferably from 0.5 to 8% by weight, more preferably from 1 to 6% by weight. A hydroxyl group-containing monomer is also preferably used, because it can form a crosslinking point with an isocyanate crosslinking agent. The percentage of the (a3) component derived from the hydroxyl group-containing monomer may be about from 0.1 to about 10% by weight, preferably from 0.5 to 8% by weight, more preferably from 1 to 6% by weight.

The acrylic polymer may be produced by a variety of known methods, for example, by a method appropriately selected from radical polymerization methods such as a bulk polymerization method, a solution polymerization method and a suspension polymerization method. A variety of known radical polymerization initiators such as azo initiators and peroxide initiators may be used. The reaction is generally performed at a temperature of about 50 to about 80° C. for a time period of 1 to 8 hours. Among the above production methods, the solution polymerization method is preferred, in which ethyl acetate, toluene or the like is generally used as a solvent for the acrylic polymer. The concentration of the solution is generally from about 20 to about 80% by weight. The acrylic polymer may be obtained in the form of an aqueous emulsion.

The weight average molecular weight of the acrylic polymer is from 1,000,000 to 3,000,000. The weight average molecular weight of the acrylic polymer is more preferably above 2,000,000 to 3,000,000, still more preferably from 2,100,000 to 2,700,000, rather than from 1,000,000 to 2,000,000. If the weight average molecular weight is less than 1,000,000, satisfactory results cannot be achieved with respect to the peripheral unevenness or durability. On the other hand, it is not preferred that the weight average molecular weight is more than 3,000,000, because the adhesion properties can be degraded. The low-molecular-weight components with a molecular weight of 100,000 or less in the acrylic polymer is preferably 15% or less by area. If the percentage of the low-molecular-weight components is kept low, the peripheral unevenness can be further suppressed. The percentage of the low-molecular-weight components is preferably 10% or less by area, more preferably 5% or less by area. In synthesizing the polymer, the percentage of the low-molecular-weight components can be reduced by controlling the concentration, the initiator species and the amount thereof, and the polymerization temperature. A high monomer concentration and a low polymerization temperature are preferred. Specifically, when azobisisobutyronitrile or benzoyl peroxide is used as a initiator, such a low percentage can be achieved by a reaction at a polymerization temperature of about 50 to about 60° C. for a time period of about 8 hours. If the polymerization temperature is too low, the polymerization reaction cannot start. If the polymerization temperature is too high, low-molecular components can increase so that the peripheral unevenness can be worse. Also when an initiator is added again halfway through the polymerization, the low-molecular components can increase so that the peripheral unevenness can be worse.

The weight average molecular weight of the acrylic polymer was measured by gel permeation chromatography (GPC) under the following conditions:
analyzer: HLC-8120GPC manufactured by Tosoh Corporation;
column: G7000HXL+GMHXL+GMHXL manufactured by Tosoh Corporation;
column size: each 7.8 mmϕ×30 cm, 90 cm in total;
column temperature: 40° C.;
flow rate: 0.8 ml/minute;
injection volume: 100 µl;
eluent: tetrahydrofuran;
detector: differential refractometer;
standard sample: polystyrene.

The percentage of components with a molecular weight of 100,000 or less was calculated as a weight fraction (% by area) from the result of the GPC measurement with a data processor (GPC-8020 manufactured by Tosoh Corporation). In this time, monomer components were not included.

The pressure-sensitive adhesive for forming the pressure-sensitive adhesive layer according to the present invention may include a crosslinking agent in addition to the acrylic polymer that is the base polymer. The crosslinking agent can improve adhesion to the optical film and durability and can achieve high temperature reliability or preserve the shape of the pressure-sensitive adhesive itself at high temperature. Any appropriate crosslinking agent may be used, such as an isocyanate type, epoxy type, peroxide type, metal chelate type, or oxazoline type crosslinking agent. One or more of these crosslinking agents may be used alone or in any combination. The present invention is preferably applied to the case where the peroxide is contained as the crosslinking agent. The crosslinking agent preferably contains a functional group reactive with a hydroxyl group, and an isocyanate crosslinking agent is particularly preferred.

Isocyanate compounds may be used as isocyanate crosslinking agents. Examples of the isocyanate compounds include isocyanate monomers such as tolylene diisocyanate, chlorophenylene diisocyanate, hexamethylene diisocyanate, tetramethylene diisocyanate, isophorone diisocyanate, xylylene diisocyanate, diphenylmethane diisocyanate, and hydrogenated diphenylmethane diisocyanate, and adduct type isocyanate compounds produced by adding the isocyanate monomer to trimethylolpropane or the like; and isocyanurate compounds, burette type compounds, and urehthane prepolymer type isocyanates produced by addition reaction of or known polyether polyols, polyester polyols, acrylic polyols, polybutadiene polyols, polyisoprene polyols, or the like.

Examples of the epoxy crosslinking agent include bisphenol A-epichlorohydrin type epoxy resins. Examples of the epoxy crosslinking agent also include ethylene glycol diglycidyl ether, polyethylene glycol diglycidyl ether, glycerol diglycidyl ether, glycerol triglycidyl ether, 1,6-hexanediol diglycidyl ether, trimethylolpropane triglycidyl ether, diglycidylaniline, N,N,N',N'-tetraglycidyl-m-xylylenediamine, 1,3-bis(N,N-diglycidylaminomethyl)cyclohexane, N,N,N', N'-tetraglycidylaminophenylmethane, triglycidylisocyanurate, m-N,N-diglycidylaminophenyl glycidyl ether, N,N-diglycidyltoluidine, and N,N-diglycidylaniline.

Various types of peroxides may be used as the peroxide crosslinking agent. Examples of such peroxides include di(2-ethylhexyl)peroxydicarbonate, di(4-tert-butylcyclohexyl)peroxydicarbonate, di-sec-butylperoxydicarbonate, tert-butylperoxyneodecanoate, tert-hexylperoxypivalate, tert-butylperoxypivalate, dilauroyl peroxide, di-n-octanoyl peroxide, 1,1,3,3-tetramethylbutyl peroxyisobutylate, 1,1,3, 3-tetramethylbutylperoxy-2-ethyl hexanoate, di(4-methylbenzoyl) peroxide, dibenzoyl peroxide, and tert-butylperoxyisobutylate. Above all, di(4-tert-butylcyclohexyl) peroxydicarbonate, dilauroyl peroxide and dibenzoyl peroxide are preferably used, because their crosslinking reaction efficiency is particularly good.

The crosslinking agent may be used in an amount of 10 parts by weight or less, preferably of 0.01 to 5 parts by weight, more preferably of 0.02 to 3 parts by weight, based on 100 parts by weight of the acrylic polymer. The use of more than 10 parts by weight of the crosslinking agent can provide excessive crosslinkage to reduce the adhesion and is not preferred.

If necessary, the pressure-sensitive adhesive may conveniently contain various types of additives such as tackifiers, plasticizers, fillers comprising glass fibers, glass beads, metal power, or any other inorganic powder, pigments, colorants, fillers, antioxidants, ultraviolet absorbing agents, and silane coupling agents, without departing from the object of the present invention. The pressure-sensitive adhesive layer may also contain fine particles so as to have light diffusion properties.

The additive is preferably a silane coupling agent. Examples of the silane coupling agent include epoxy structure-containing silane coupling agents such as 3-glycidoxypropyltrimethoxysilane, 3-glycidoxypropylmethyldimethoxysilane, and 2-(3,4-epoxycyclohexyl) ethyltrimethoxysilane; amino group-containing silane coupling agents such as 3-aminopropyltrimethoxysilane, N-(2-aminoethyl)-3-aminopropyltrimethoxysilane, N-(2-aminoethyl)-3-aminopropylmethyldimethoxysilane, and 3-triethoxysilyl-N-(1,3-dimethylbutylidene)propylamine; (meth)acrylic group-containing silane coupling agents such as 3-acryloxypropyltrimethoxysilane and 3-methacryloxypropyltriethoxysilane; isocyanate group-containing silane coupling agents such as 3-isocyanatepropyltriethoxysilane; 3-chloropropyltrimethoxysilane; and acetoacetyl group-containing trimethoxysilane. The silane coupling agent may be used alone, or a mixture of two or more silane coupling agents may be used. The amount of the addition of the silane coupling agent may be from 0.01 to 2 parts by weight, preferably from 0.02 to 1 part by weight, based on 100 parts by weight of the acrylic polymer.

The pressure-sensitive adhesive optical film of the present invention includes the transparent base film, the discotic liquid crystal layer provided on the transparent base film, and the pressure-sensitive adhesive layer formed from the pressure-sensitive adhesive on the discotic liquid crystal layer. When an undercoat layer is provided on the discotic liquid crystal layer, the pressure-sensitive adhesive layer is formed on the undercoat layer.

Examples of methods for forming the pressure-sensitive adhesive layer include, but are not limited to, a method including applying a pressure-sensitive adhesive solution to the discotic liquid crystal layer (or the undercoat layer) by any appropriate spreading method such as casting and coating, and drying it, and a method including forming the pressure-sensitive adhesive layer on a release sheet and transferring it from the release sheet. Coating methods that may be used include roll coating methods such as reverse coating and gravure coating and other coating methods such as spin coating methods, screen coating methods, fountain coating methods, dipping methods, and spray methods. After the pressure-sensitive adhesive solution is applied, the solvent and/or water may be evaporated by a drying step so that a pressure-sensitive adhesive layer with a desired thickness can be obtained.

The thickness of the pressure-sensitive adhesive layer may be appropriately determined depending on the application purpose, the adhesive strength or the like and is generally from 1 to 500 µm, preferably from 1 to 50 µm, more preferably from 1 to 40 µm, still more preferably from 5 to 30 µm, particularly preferably from 10 to 25 µm. A thickness of less than 1 µm can lead to poor durability. If it is too thick, peeling off or separation can tend to occur due to foaming or the like so that the appearance can tend to be poor.

The pressure-sensitive adhesive layer containing the acrylic polymer may also be formed by applying a UV-curable pressure-sensitive adhesive syrup to a release film and irradiating the syrup with radiation such as UV and electron beam. In this case, the pressure-sensitive adhesive may contain a crosslinking agent so that reliability or retention of the shape of the pressure-sensitive adhesive itself can be achieved at high temperature.

The pressure-sensitive adhesive layer may be crosslinked in the drying or UV irradiation step. Alternatively, another crosslinking mode may also be chosen, in which aging by warming state or standing at room temperature is performed so as to facilitate crosslinking after the drying.

Examples of constituent materials of a release sheet include: proper thin items such as paper; synthetic resin films made of polyethylene, polypropylene, polyethylene terephthalate; a rubber sheet, paper, cloth, unwoven fabric, net, a foam sheet and a metal foil, and a laminate thereof. In order to enhance releasability from a pressure-sensitive adhesive layer, a release treatment imparting a low adherence, such as a silicone treatment, a long chain alkylation treatment or a fluorination treatment, may be applied onto a surface of a release sheet when required.

In addition, ultraviolet absorbing property may be given to the above-mentioned each layer of the optical film, and the adhesive layer etc., of the pressure-sensitive adhesive optical film of the present invention, using a method of adding UV absorbents, such as salicylic acid ester type compounds, benzophenol type compounds, benzotriazol type compounds, cyano acrylate type compounds, and nickel complex salt type compounds.

In order to impart antistatic properties to the pressure-sensitive adhesive optical film, an antistatic agent may also be used. The antistatic agent may be added to each layer, or alternatively, an antistatic layer may be independently formed. Examples of the antistatic agent include ionic surfactants; electrically-conductive polymers such as polyaniline, polythiophene, polypyrrole, and polyquinoxaline; and metal oxides such as tin oxide, antimony oxide and indium oxide. In particular, electrically-conductive polymers are preferably used, in view of optical properties, appearance, antistatic effect, and stability of the antistatic effect during heating or humidifying. In particular, a water-soluble or dispersible electrically-conductive polymer such as polyaniline and polythiophene is preferably used, because when the water-soluble or dispersible electrically-conductive polymer is used as an antistatic layer-forming material in the coating process, the optical film substrate can be prevented from deteriorating due to an organic solvent.

As shown in FIG. 3, the optical film according to the present invention may include, and a polarizer 6 and a transparent protective film 7 that are laminated in this order on one side of a transparent base film 1 where the discotic liquid crystal layer 3 is not formed.

The polarizer 6 may be bonded to the transparent base film 1 with an adhesive. While the transparent base film 1 also serves as a transparent protective film for the polarizer 6 in FIGS. 2 and 3, a polarizing plate including a polarizer and a transparent protective film laminated on one or both sides of the polarizer may be laminated on the transparent base film 1.

A polarizer is not limited especially but various kinds of polarizer may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type alignment films, such as dehydrated polyvinyl alcohol and dehydrochlorinated polyvinyl chloride, etc. may be mentioned. In these, a polyvinyl alcohol type film on which dichromatic materials such as iodine, is absorbed and aligned after stretched is suitably used. Although thickness of polarizer is not especially limited, the thickness of about 5 to 80 μm is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide, which may include zinc sulfate, zinc chloride. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

As a materials forming the transparent protective film prepared on one side or both sides of the above-mentioned polarizer, with outstanding transparency, mechanical strength, heat stability, moisture cover property, isotropy, etc. may be preferable. The transparent protective film may be made of the same material as the transparent base film and may have the same thickness as the transparent base film.

The transparent base film and the transparent protective film may use the same or different polymer materials.

The polarizer, the transparent base film and the transparent protective film are generally bonded together with a water-based adhesive or the like interposed therebetween. Examples of the water-based adhesive include isocyanate adhesives, polyvinyl alcohol adhesives, gelatin adhesives, vinyl adhesives, latex adhesives, aqueous polyurethane adhesives, and aqueous polyester adhesives. Before the polarizer, the transparent base film and the transparent protective film are bonded together, the transparent base film and the transparent protective film may be subjected to activation treatment. Various methods such as saponification, corona treatment, low-pressure UV treatment, and plasma treatment may be used for the activation treatment. When the transparent base film is made of triacetylcellulose, norbornene resin, polycarbonate, or polyolefin resin, the activation treatment is particularly effective.

As the opposite side of the polarizing-adhering surface above-mentioned transparent protective film, a film with a hard coat layer and various processing aiming for antireflection, sticking prevention and diffusion or anti glare may be used.

A hard coat processing is applied for the purpose of protecting the surface of the polarization plate from damage, and this hard coat film may be formed by a method in which, for example, a curable coated film with excellent hardness, slide property etc. is added on the surface of the protective film using suitable ultraviolet curable type resins, such as acrylic type and silicone type resins. Antireflection processing is applied for the purpose of antireflection of outdoor daylight on the surface of a polarization plate and it may be prepared by forming an antireflection film according to the conventional method etc. Besides, a sticking prevention processing is applied for the purpose of adherence prevention with adjoining layer.

In addition, an anti glare processing is applied in order to prevent a disadvantage that outdoor daylight reflects on the surface of a polarization plate to disturb visual recognition of transmitting light through the polarization plate, and the processing may be applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 μm, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 50 weight parts to the transparent resin 100 weight parts that forms the fine concavo-convex structure on the surface, and preferably 5 to 25 weight parts. An anti glare layer may serve as a diffusion layer (viewing angle expanding function etc.) for diffusing transmitting light through the polarization plate and expanding a viewing angle etc.

In addition, the above-mentioned antireflection layer, sticking prevention layer, diffusion layer, anti glare layer, etc. may be built in the protective film itself, and also they may be prepared as an optical layer different from the protective film.

Besides the optical film including the polarizing plate laminated, as an optical film used for the pressure-sensitive adhesive optical film of the present invention, optical layers used for forming image displays such as liquid crystal display or the like, are used. For example, optical layers, such as a reflective plate, a transflective plate, a retardation plate (a half wavelength plate and a quarter wavelength plate included), and a viewing angle compensation film, which may be used for formation of a liquid crystal display or the likes are mentioned. These are used in practice as an optical film, or as one layer or two layers or more of optical layers laminated with polarizing plate.

Especially preferable polarizing plates are; a reflection type polarization plate or a transflective type polarization plate in which a reflective plate or a transflective reflective plate is further laminated onto a polarizing plate of the present invention; an elliptically polarizing plate or a circular polarizing plate in which a retardation plate is further laminated onto the polarizing plate; or a polarizing plate in which a brightness enhancement film is further laminated onto the polarizing plate.

A reflective layer is prepared on a polarization plate to give a reflection type polarization plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarization plate may be formed using suitable methods, such as a method in which a reflective layer of metal etc. is, if required, attached to one side of a polarization plate through a transparent protective layer etc.

As an example of a reflection type polarization plate, a plate may be mentioned on which, if required, a reflective layer is formed using a method of attaching a foil and vapor deposition film of reflective metals, such as aluminum, to one side of a matte treated protective film. Moreover, a different type of plate with a fine concavo-convex structure on the surface obtained by mixing fine particle into the above-mentioned protective film, on which a reflective layer of concavo-convex structure is prepared, may be mentioned. The reflective layer that has the above-mentioned fine concavo-convex structure diffuses incident light by random reflection to prevent directivity and glaring appearance, and has an advantage of controlling unevenness of light and darkness etc. Moreover, the protective film containing the fine particle has an advantage that unevenness of light and darkness may be controlled more effectively, as a result that an incident light and its reflected light that is transmitted through the film are diffused. A reflective layer with fine concavo-convex structure on the surface effected by a surface fine concavo-convex structure of a protective film may be formed by a method of attaching a metal to the surface of a transparent protective layer directly using, for example, suitable methods of a vacuum evaporation method, such as a vacuum deposition method, an ion plating method, and a sputtering method, and a plating method etc.

Instead of a method in which a reflection plate is directly given to the protective film of the above-mentioned polarization plate, a reflection plate may also be used as a reflective sheet constituted by preparing a reflective layer on the suitable film for the transparent film. In addition, since a reflective layer is usually made of metal, it is desirable that the reflective side is covered with a protective film or a polarization plate etc. when used, from a viewpoint of preventing deterioration in reflectance by oxidation, of maintaining an initial reflectance for a long period of time and of avoiding preparation of a protective layer separately etc.

In addition, a transflective type polarizing plate may be obtained by preparing the above-mentioned reflective layer as a transflective type reflective layer, such as a half-mirror etc. that reflects and transmits light. A transflective type polarization plate is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transflective type polarization plate. That is, the transflective type polarization plate is useful to obtain of a liquid crystal display of the type that saves energy of light sources, such as a back light, in a well-lighted atmosphere, and can be used with a built-in light source if needed in a comparatively dark atmosphere etc.

A description of the above-mentioned elliptically polarization plate or circularly polarization plate on which the retardation plate is laminated to the polarization plates will be made in the following paragraph. These polarization plates change linearly polarized light into elliptically polarized light or circularly polarized light, elliptically polarized light or circularly polarized light into linearly polarized light or change the polarization direction of linearly polarization by a function of the retardation plate. As a retardation plate that changes circularly polarized light into linearly polarized light or linearly polarized light into circularly polarized light, what is called a quarter wavelength plate (also called $\lambda/4$ plate) is used. Usually, half-wavelength plate (also called $\lambda/2$ plate) is used, when changing the polarization direction of linearly polarized light.

Elliptically polarization plate is effectively used to give a monochrome display without above-mentioned coloring by compensating (preventing) coloring (blue or yellow color) produced by birefringence of a liquid crystal layer of a super twisted nematic (STN) type liquid crystal display. Furthermore, a polarization plate in which three-dimensional refractive index is controlled may also preferably compensate (prevent) coloring produced when a screen of a liquid crystal display is viewed from an oblique direction. Circularly polarization plate is effectively used, for example, when adjusting a color tone of a picture of a reflection type liquid crystal display that provides a colored picture, and it also has function of antireflection.

As retardation plates, birefringence films obtained by uniaxial or biaxial stretching polymer materials, oriented films of liquid crystal polymers, and materials in which orientated layers of liquid crystal polymers are supported with films may be mentioned. Although a thickness of a retardation plate also is not especially limited, it is in general approximately from about 20 to 150 μm.

As polymer materials, for example, polyvinyl alcohols, polyvinyl butyrals, polymethyl vinyl ethers, poly hydroxyethyl acrylates, hydroxyethyl celluloses, hydroxypropyl celluloses, methyl celluloses, polycarbonates, polyarylates, polysulfones, polyethylene terephthalates, polyethylene naphthalates, polyethersulfones, polyphenylene sulfides, polyphenylene oxides, polyallyl sulfones, polyvinyl alcohols, polyamides, polyimides, polyolefins, polyvinyl chlorides, cellulose type polymers, or bipolymers, terpolymers, graft copolymers, blended materials of the above-mentioned polymers may be mentioned. These polymer raw materials make oriented materials (stretched film) using a stretching process and the like.

As liquid crystalline polymers, for example, various kinds of polymers of principal chain type and side chain type in which conjugated linear atomic groups (mesogens) demonstrating liquid crystalline orientation are introduced into a principal chain and a side chain may be mentioned. As examples of principal chain type liquid crystalline polymers, polymers having a structure where mesogen groups are combined by spacer parts demonstrating flexibility, for example, polyester based liquid crystalline polymers of nematic orientation property, discotic polymers, cholesteric polymers, etc. may be mentioned. As examples of side chain type liquid crystalline polymers, polymers having polysiloxanes, polyacrylates, polymethacrylates, or polymalonates as a principal chain structure, and polymers having mesogen parts comprising para-substituted ring compound units providing nematic orientation property as side chains via spacer parts comprising conjugated atomic groups may be mentioned. These liquid crystalline polymers, for example, is obtained by spreading a solution of a liquid crystal polymer on an orientation treated surface where rubbing treatment was performed to a surface of thin films, such as polyimide and polyvinyl alcohol, formed on a glass plate and or where silicon oxide was deposited by an oblique evaporation method, and then by heat-treating.

A retardation plate may be a retardation plate that has a proper retardation according to the purposes of use, such as various kinds of wavelength plates and plates aiming at compensation of coloring by birefringence of a liquid crystal layer and of visual angle, etc., and may be a retardation plate in which two or more sorts of retardation plates is laminated so that optical properties, such as retardation, may be controlled.

The above-mentioned elliptically polarization plate and an above-mentioned reflected type elliptically polarization plate are laminated plate combining suitably a polarization plate or a reflection type polarization plate with a retardation plate. This type of elliptically polarization plate etc. may be manufactured by combining a polarization plate (reflected type) and a retardation plate, and by laminating them one by one separately in the manufacture process of a liquid crystal display. On the other hand, the polarization plate in which lamination was beforehand carried out and was obtained as an optical film, such as an elliptically polarization plate, is excellent in a stable quality, a workability in lamination etc., and has an advantage in improved manufacturing efficiency of a liquid crystal display.

The polarization plate with which a polarization plate and a brightness enhancement film are adhered together is usually used being prepared in a backside of a liquid crystal cell. A brightness enhancement film shows a characteristic that reflects linearly polarization light with a predetermined polarization axis, or circularly polarization light with a predetermined direction, and that transmits other light, when natural light by back lights of a liquid crystal display or by reflection from a back-side etc., comes in. The polarization plate, which is obtained by laminating a brightness enhancement film to a polarization plate, thus does not transmit light without the predetermined polarization state and reflects it, while obtaining transmitted light with the predetermined polarization state by accepting a light from light sources, such as a backlight. This polarization plate makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarization state. The polarization plate simultaneously supplies polarized light that is difficult to be absorbed in a polarizer, and increases the quantity of the light usable for a liquid crystal picture display etc., and as a result luminosity may be improved. That is, in the case where the light enters through a polarizer from backside of a liquid crystal cell by the back light etc. without using a brightness enhancement film, most of the light, with a polarization direction different from the polarization axis of a polarizer, is absorbed by the polarizer, and does not transmit through the polarizer. This means that although influenced with the characteristics of the polarizer used, about 50 percent of light is absorbed by the polarizer, the quantity of the light usable for a liquid crystal picture display etc. decreases so much, and a resulting picture displayed becomes dark. A brightness enhancement film does not enter the light with the polarizing direction absorbed by the polarizer into the polarizer but reflects the light once by the brightness enhancement film, and further makes the light reversed through the reflective layer etc. prepared in the backside to re-enter the light into the brightness enhancement film. By this above-mentioned repeated operation, only when the polarization direction of the light reflected and reversed between the both becomes to have the polarization direction which may pass a polarizer, the brightness enhancement film transmits the light to supply it to the polarizer. As a result, the light from a backlight may be efficiently used for the display of the picture of a liquid crystal display to obtain a bright screen.

A diffusion plate may also be prepared between brightness enhancement film and the above described reflective layer, etc. A polarized light reflected by the brightness enhancement film goes to the above described reflective layer etc., and the diffusion plate installed diffuses passing light uniformly and changes the light state into depolarization at the same time. That is, the diffusion plate returns polarized light to natural light state. Steps are repeated where light, in the unpolarized state, i.e., natural light state, reflects through reflective layer and the like, and again goes into brightness enhancement film through diffusion plate toward reflective layer and the like. Diffusion plate that returns polarized light to the natural light state is installed between brightness enhancement film and the above described reflective layer, and the like, in this way, and thus a uniform and bright screen may be provided while maintaining brightness of display screen, and simultaneously controlling non-uniformity of brightness of the display screen. By preparing such diffusion plate, it is considered that number of repetition times of reflection of a first incident light increases with sufficient degree to provide uniform and bright display screen conjointly with diffusion function of the diffusion plate.

The suitable films are used as the above-mentioned brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film; an aligned film of cholesteric liquid-crystal polymer; a film that has the characteristics of reflecting a circularly polarized light with either left-handed or right-handed rotation and transmitting other light, such as a film on which the aligned cholesteric liquid crystal layer is supported; etc. may be mentioned.

Therefore, in the brightness enhancement film of a type that transmits a linearly polarized light having the above-mentioned predetermined polarization axis, by arranging the polarization axis of the transmitted light and entering the light into a polarization plate as it is, the absorption loss by the polarization plate is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light region, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarization plate and a brightness enhancement film may consist of one or more retardation layers.

In addition, also in a cholesteric liquid-crystal layer, a layer reflecting a circularly polarized light in a wide wavelength ranges, such as a visible-light region, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarization plate may consist of multi-layered film of laminated layers of a polarization plate and two of more of optical layers as the above-mentioned separated type polarization plate. Therefore, a polarization plate may be a reflection type elliptically polarization plate or a semi-transmission type elliptically polarization plate, etc. in which the above-mentioned reflection type polarization plate or a transflective type polarization plate is combined with above described retardation plate respectively.

Although an optical film with the above described optical layer laminated to the polarizing plate may be formed by a method in which laminating is separately carried out sequentially in manufacturing process of a liquid crystal display etc., an optical film in a form of being laminated beforehand has an outstanding advantage that it has excellent stability in quality and assembly workability, etc., and thus manufacturing processes ability of a liquid crystal display etc. may be raised. Proper adhesion means, such as an adhesive layer, may be used for laminating. On the occasion of adhesion of the above described polarizing plate and other optical films, the optical axis may be set as a suitable configuration angle according to the target retardation characteristics etc.

The pressure-sensitive adhesive optical film of the present invention is preferably used to form various types of image displays such as liquid crystal displays. Liquid crystal displays may be formed according to conventional techniques. Specifically, liquid crystal displays are generally formed by appropriately assembling a liquid crystal cell and the pressure-sensitive adhesive optical film and optionally other components such as a lighting system and incorporating a driving circuit according to any conventional technique, except that the optical film of the present invention is used. Any type of liquid crystal cell may also be used such as a TN type, an STN type and a π type.

Suitable liquid crystal displays, such as liquid crystal display with which the above pressure-sensitive adhesive optical film has been located at one side or both sides of the liquid crystal cell, and with which a backlight or a reflective plate is used for a lighting system may be manufactured. In this case, the optical film may be installed in one side or both sides of the liquid crystal cell. When installing the optical films in both sides, they may be of the same type or of different type. Furthermore, in assembling a liquid crystal display, suitable parts, such as diffusion plate, anti-glare layer, antireflection film, protective plate, prism array, lens array sheet, optical diffusion plate, and backlight, may be installed in suitable position in one layer or two or more layers.

Subsequently, organic electro luminescence equipment (organic EL display) will be explained. Generally, in organic EL display, a transparent electrode, an organic luminescence layer and a metal electrode are laminated on a transparent substrate in an order configuring an illuminant (organic electro luminescence illuminant). Here, a organic luminescence layer is a laminated material of various organic thin films, and much compositions with various combination are known, for example, a laminated material of hole injection layer comprising triphenylamine derivatives etc., a luminescence layer comprising fluorescent organic solids, such as anthracene; a laminated material of electronic injection layer comprising such a luminescence layer and perylene derivatives, etc.; laminated material of these hole injection layers, luminescence layer, and electronic injection layer etc.

An organic EL display emits light based on a principle that positive hole and electron are injected into an organic luminescence layer by impressing voltage between a transparent electrode and a metal electrode, the energy produced by recombination of these positive holes and electrons excites fluorescent substance, and subsequently light is emitted when excited fluorescent substance returns to ground state. A mechanism called recombination which takes place in a intermediate process is the same as a mechanism in common diodes, and, as is expected, there is a strong non-linear relationship between electric current and luminescence strength accompanied by rectification nature to applied voltage.

In an organic EL display, in order to take out luminescence in an organic luminescence layer, at least one electrode must be transparent. The transparent electrode usually formed with transparent electric conductor, such as indium tin oxide (ITO), is used as an anode. On the other hand, in order to make electronic injection easier and to increase luminescence efficiency, it is important that a substance with small work function is used for cathode, and metal electrodes, such as Mg—Ag and Al—Li, are usually used.

In organic EL display of such a configuration, an organic luminescence layer is formed by a very thin film about 10 nm in thickness. For this reason, light is transmitted nearly completely through organic luminescence layer as through transparent electrode. Consequently, since the light that enters, when light is not emitted, as incident light from a surface of a transparent substrate and is transmitted through a transparent electrode and an organic luminescence layer and then is reflected by a metal electrode, appears in front surface side of the transparent substrate again, a display side of the organic EL display looks like mirror if viewed from outside.

In an organic EL display containing an organic electro luminescence illuminant equipped with a transparent electrode on a surface side of an organic luminescence layer that emits light by impression of voltage, and at the same time equipped with a metal electrode on a back side of organic luminescence layer, a retardation plate may be installed between these transparent electrodes and a polarization plate, while preparing the polarization plate on the surface side of the transparent electrode.

Since the retardation plate and the polarization plate have function polarizing the light that has entered as incident light from outside and has been reflected by the metal electrode, they have an effect of making the mirror surface of metal electrode not visible from outside by the polarization action. If a retardation plate is configured with a quarter wavelength plate and the angle between the two polarization directions of the polarization plate and the retardation plate is adjusted to π/4, the mirror surface of the metal electrode may be completely covered.

This means that only linearly polarized light component of the external light that enters as incident light into this organic EL display is transmitted with the work of polarization plate. This linearly polarized light generally gives an elliptically polarized light by the retardation plate, and especially the retardation plate is a quarter wavelength plate, and moreover when the angle between the two polarization directions of the polarization plate and the retardation plate is adjusted to π/4, it gives a circularly polarized light.

This circularly polarized light is transmitted through the transparent substrate, the transparent electrode and the organic thin film, and is reflected by the metal electrode, and then is transmitted through the organic thin film, the transparent electrode and the transparent substrate again, and is turned into a linearly polarized light again with the retardation plate. And since this linearly polarized light lies at right angles to the polarization direction of the polarization plate, it cannot be transmitted through the polarization plate. As the result, mirror surface of the metal electrode may be completely covered.

EXAMPLES

The present invention is more specifically described with some examples below which are not intended to limit the scope of the present invention.

Example 1

(Preparation of Pressure-Sensitive Adhesive)

To a four-neck flask equipped with a cooling tube, a stirring blade and a thermometer were added 87 parts by weight of butyl acrylate, 13 parts by weight of phenoxyethyl acrylate, 0.1 parts by weight of 2,2'-azobisisobutyronitrile, and 140 parts by weight of ethyl acetate. After the air was sufficiently replaced with nitrogen, the mixture was allowed to react at 55° C. for 8 hours, while stirred under a nitrogen gas stream, so that a solution of acrylic polymers with a weight average molecular weight of 1,700,000 (the percentage of components with a molecular weight of 100,000 or less: 3% by area) was obtained. Based on 100 parts by weight of the solids in the acrylic polymer solution, 0.6 parts by weight (in terms of solid) of a polyisocyanate crosslinking agent comprising a trimethylolpropane/tolylene diisocyanate adduct (Coronate L manufactured by Nippon Polyurethane Industry Co., Ltd.) and 0.1 parts by weight of a silane coupling agent (KBM403 manufactured by Shin-Etsu Silicone Co., Ltd.) were added to the acrylic polymer solution to produce a pressure-sensitive adhesive solution.

(Formation of Pressure-Sensitive Adhesive Layer)

The resulting pressure-sensitive adhesive solution was applied by reverse roll coating to a separator made of a release-treated polyester film (38 μm in thickness) such that the pressure-sensitive adhesive layer would have a thickness of 25 μm after drying, and then heated at 130° C. for 3 minutes for solvent vaporization so that a pressure-sensitive adhesive layer was obtained.

(Optical Film)

Wide View (WV) Film manufactured by Fuji Photo Film Co., Ltd. was used. WV Film included a transparent base film of a cellulose polymer film and a discotic liquid crystal layer that was provided on the film and composed of obliquely aligned discotic liquid crystal molecules.

The obliquely-aligned discotic liquid crystal molecule layer was separated from WV Film, and properties were measured at a wavelength (λ) of 590 nm with KOBRA-21ADH manufactured by Oji Scientific Instruments. The maximum in-plane refractive index was represented by nx, the refractive index in a direction perpendicular to the direction of the maximum in-plane refractive index was represented by ny, and the refractive index in the thickness direction was represented by nz. The thickness was represented by d. The transparent support had a Δnd value (=(nx−ny)d) of 12 nm and an Rth value (=(nx−nz)d) of 100 nm. On the other hand, the obliquely aligned layer was measured for retardation, while the angle of incidence was changed from −50° to 50° with respect to the direction of the tilted optical axis. As a result, the obliquely aligned layer had a Δnd value of 30 nm, an Rth value of 150 nm and an average tilt angle θ of 17°.

The transparent base film side of the WV Film was saponified, and then the saponified surface was bonded to a polyvinyl alcohol-based polarizer (SEG-5424WL manufactured by Nitto Denko Corporation) with a polyvinyl alcohol-based adhesive. The other side of the polarizer was bonded to a transparent protective film (an 80 μm-thick triacetylcellulose film) with the same polyvinyl alcohol-based adhesive so that an optical film having a polarizing plate, that is a viewing angle expanding film-attached polarizing plate, was prepared.

(Preparation of Pressure-Sensitive Adhesive Optical Film)

An undercoating agent was applied with a wire bar to the surface of the discotic liquid crystal layer of the viewing angle expanding film-attached polarizing plate to form an undercoat layer (100 nm in thickness). The undercoating agent used was a polyethyleneimine-based agent (Polyment NK-380 manufactured by Nippon Shokubai Co., Ltd.). The release sheet with the pressure-sensitive adhesive layer formed thereon was bonded to the undercoat layer so that a pressure-sensitive adhesive optical film was prepared.

Examples 2 to 12 and Comparative Examples 1 to 4

Pressure-sensitive adhesive solutions were prepared as in Example 1, except that the type or amount of the monomer components for use in the preparation of the pressure-sensitive adhesives were changed as shown in Table 1 and that the reaction conditions were controlled such that the weight average molecular weight of the resulting acrylic polymers and the percentages of low-molecular-weight components shown in Table 1 were achieved. In Examples other than Example 5, polymerization was performed at a temperature of 50 to 60° C. for 8 hours such that the percentage of low-molecular-weight components in the acrylic polymer shown in Table 1 was achieved. In Example 5, polymerization was performed at 60° C. for 4 hours and then at 80° C. for 2 hours such that the percentage of low-molecular-weight components in the acrylic polymer shown in Table 1 was achieved. Pressure-sensitive adhesive optical films were prepared as in Example 1, except that the resulting pressure-sensitive adhesive solutions were used instead.

The resulting pressure-sensitive adhesive optical films were evaluated as described below. The results are shown in Table 1.

(Peripheral Unevenness)

Two sample pieces (420 mm in length×320 mm in width) were prepared by cutting each pressure-sensitive adhesive optical film. The pressure-sensitive adhesive optical film samples were bonded with a laminator to both sides of a 0.07 mm-thick non-alkali glass plate in the crossed Nicol arrangement. The sample laminate was then subjected to autoclave treatment at 50° C. under 5 atm for 15 minutes. The sample laminate was treated for 500 hours under each of the condition of 100° C. (heating) and the condition of 90% R.H. (humidifying) at 60° C. The sample laminate was then placed on a 10,000 candela backlight, and light leakage was visually evaluated according to the criteria below.

⊙: There is neither peripheral unevenness nor practical problem.

○: Peripheral unevenness is slightly observed, but there is no practical problem.

Δ: Peripheral unevenness is observed, but there is no practical problem.

×: Peripheral unevenness is significantly observed to cause a practical problem.

(Durability)

The pressure-sensitive adhesive optical film (15 inches in size) was attached to a non-alkali glass plate (Corning 1737 with a thickness of 0.7 mm) and subjected to treatment in an autoclave at 50° C. under 0.5 MPa for 15 minutes. The sample was then treated for 500 hours under each of the condition of 90° C. (heating) and the condition of 95% R.H. (humidifying) at 60° C. The sample was then visually evaluated according to the criteria below.

○: None of separation, peeling off and foaming occurs between the pressure-sensitive adhesive optical film and the non-alkali glass plate.

×: Separation, peeling off or foaming occurs between the pressure-sensitive adhesive optical film and the non-alkali glass plate.

TABLE 1

| | Monomer Components and Parts by Weight Thereof | | | | | | | | | | Acrylic Polymers | | Evaluations | | | |
| | Monomer (a1) | Monomer (a2) | | | | | Monomer (a3) | | | | Weight Average Molecular Weight | Low-Molecular Weight Component Percentage (% by area) | Peripheral Unevenness | | Durability | |
| | BA | PEA | HPPA | BzA | IBXA | CHA | AA | DMAEA | MEA | HBA | | | Heating | Humidifying | Heating | Humidifying |
| Example 1 | 87 | 13 | — | — | — | — | — | — | — | — | 1,700,000 | 3 | ○ | ○ | ○ | ○ |
| Example 2 | 80 | 20 | — | — | — | — | — | — | — | — | 1,600,000 | 2 | ○ | ○ | ○ | ○ |
| Example 3 | 50 | 50 | — | — | — | — | — | — | — | — | 1,500,000 | 3 | ○ | ○ | ○ | ○ |
| Example 4 | 50 | 50 | — | — | — | — | — | — | — | — | 2,500,000 | 2 | ⊙ | ⊙ | ○ | ○ |
| Example 5 | 50 | 50 | — | — | — | — | — | — | — | — | 2,000,000 | 20 | Δ | Δ | ○ | ○ |
| Example 6 | 50 | 48.7 | — | — | — | — | 1 | — | — | 0.3 | 2,500,000 | 4 | ⊙ | ⊙ | ○ | ○ |
| Example 7 | 50 | — | 50 | — | — | — | — | — | — | — | 2,400,000 | 3 | ⊙ | ⊙ | ○ | ○ |
| Example 8 | 50 | — | — | 50 | — | — | — | — | — | — | 2,500,000 | 4 | ○ | ○ | ○ | ○ |
| Example 9 | 50 | — | — | — | 50 | — | — | — | — | — | 2,100,000 | 5 | Δ | Δ | ○ | ○ |
| Example 10 | 50 | — | — | — | — | 50 | — | — | — | — | 1,400,000 | 3 | Δ | Δ | ○ | ○ |
| Example 11 | 49 | 48.71 | — | — | — | — | 1 | 1 | — | 0.3 | 2,400,000 | 5 | ⊙ | ⊙ | ○ | ○ |
| Example 12 | 49 | 48.71 | — | — | — | — | 1 | — | 1 | 0.3 | 2,300,000 | 4 | ⊙ | ⊙ | ○ | ○ |
| Comparative Example 1 | 50 | 50 | — | — | — | — | — | — | — | — | 600,000 | 5 | X | X | X | X |
| Comparative Example 2 | 20 | 80 | — | — | — | — | — | — | — | — | 1,400,000 | 5 | X | X | X | X |
| Comparative Example 3 | 95 | — | — | — | — | — | 5 | — | — | — | 2,300,000 | 4 | X | X | ○ | ○ |
| Comparative Example 4 | 99 | — | — | — | — | — | — | — | — | 1 | 1,700,000 | 3 | X | X | ○ | ○ |

In Table 1, BA represents n-butyl acrylate, PEA represents phenoxyethyl acrylate, HPPA represents phenoxy-2-hydroxypropyl acrylate, BzA represents benzyl acrylate, IBXA represents isobornyl acrylate, CHA represents cyclohexyl acrylate, AA represents acrylic acid, DMAEA represents dimethylaminoethyl acrylate, MEA represents methoxyethyl acrylate, and HBA represents 2-hydroxybutyl acrylate.

What is claimed is:

1. A pressure-sensitive adhesive optical film, comprising:
an optical film comprising a transparent base film and a discotic liquid crystal layer on one side of the transparent base film; and a pressure-sensitive adhesive layer that is provided on the discotic liquid crystal layer, wherein the pressure-sensitive adhesive layer is made from a pressure-sensitive adhesive containing an acrylic polymer comprising 30 to 90% by weight of an alkyl (meth)acrylate (a1) and 10 to 70% by weight of a ring structure-containing (meth)acrylate (a2) as monomer units and a crosslinking agent, wherein the ring structure-containing (meth)acrylate (a2) is an aromatic ring structure-containing (meth)acrylate where the aromatic ring structure is linked by an ether linkage which produces higher polarizability,
a weight average molecular weight of the acrylic polymer is within a range of above 2,000,000 to 3,000,000, and the percentage of components with a molecular weight of 100,000 or less in the acrylic polymer is 15% or less by area as measured by gel permeation chromatography.

2. The pressure-sensitive adhesive optical film according to claim 1, wherein the acrylic polymer further comprises 10% or less by weight of a monomer unit (a3) besides the components (a1) and (a2).

3. The pressure-sensitive adhesive optical film according to claim 2, wherein the monomer unit (a3) is selected from the group consisting of hydroxyl group-containing monomers, carboxyl group-containing monomers, acid anhydride group-containing monomers, sulfonic acid group-containing monomers and phosphate group-containing monomers.

4. The pressure-sensitive adhesive optical film according to claim 1, wherein the pressure-sensitive adhesive contains a silane coupling agent.

5. The pressure-sensitive adhesive optical film according to claim 1, wherein the pressure-sensitive adhesive layer is provided on the discotic liquid crystal layer via an undercoat layer.

6. The pressure-sensitive adhesive optical film according to claim 5, wherein the undercoat layer is made of a polyethyleneimine-based material.

7. The pressure-sensitive adhesive optical film according to claim 1, wherein the optical film further comprises a polarizer that is laminated on another side of the transparent base film where the discotic liquid crystal layer is not provided.

8. An image display, comprising the pressure-sensitive adhesive optical film according to claim 1.

9. The pressure-sensitive adhesive optical film according to claim 1, wherein the ring structure-containing (meth)acrylate (a2) is selected from the group consisting of phenoxyethyl (meth)acrylate, phenoxy-2-hydroxypropyl(meth)acrylate, phenol ethylene oxide-modified (meth)acrylate, 2-naphthoxyethyl(meth)acrylate, 2-(4-methoxy-1-naphthoxy)ethyl (meth)acrylate, phenoxypropyl(meth)acrylate and phenoxyethylene glycol(meth)acrylate.

10. The pressure-sensitive adhesive optical film according to claim 1, wherein the crosslinking agent is selected from the group consisting of an isocyanate type crosslinking agent, epoxy type crosslinking agent, peroxide type crosslinking agent, metal chelate type crosslinking agent and oxazoline type crosslinking agent.

11. The pressure-sensitive adhesive optical film according to claim 1, wherein the aromatic ring structure-containing (meth)acrylate is phenoxyethyl(meth)acrylate.

* * * * *